(12) United States Patent
Ricart et al.

(10) Patent No.: US 12,487,071 B2
(45) Date of Patent: Dec. 2, 2025

(54) METHOD FOR DETERMINING A DEFORMATION OF AN AREA OF A PART OBTAINED BY ADDITIVE MANUFACTURING

(71) Applicants: UNIVERSITE GRENOBLE ALPES, Saint-Martin-d'Hères (FR); INSTITUT POLYTECHNIQUE DE GRENOBLE, Grenoble (FR); CENTRE NATIONAL DE LA RECHERCHE SCIENTIFIQUE, Paris (FR)

(72) Inventors: Thibault Ricart, Seyssinet Pariset (FR); Skandar Basrour, Grenoble (FR); Matthieu Museau, Le Pont de Claix (FR); Pascal Robert, Grenoble (FR); Nicolas Béraud, Saint-Martin-d'Hères (FR); Henri Paris, Grenoble (FR)

(73) Assignees: UNIVERSITE GRENOBLE ALPES, Saint-Martin-d'Hères (FR); INSTITUT POLYTECHNIQUE DE GRENOBLE, Grenoble (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 221 days.

(21) Appl. No.: 18/574,283

(22) PCT Filed: Jul. 5, 2022

(86) PCT No.: PCT/FR2022/051333
§ 371 (c)(1),
(2) Date: Dec. 26, 2023

(87) PCT Pub. No.: WO2023/281201
PCT Pub. Date: Jan. 12, 2023

(65) Prior Publication Data
US 2024/0361118 A1    Oct. 31, 2024

(30) Foreign Application Priority Data

Jul. 6, 2021   (FR) ..................... 2107300

(51) Int. Cl.
*G01B 7/24* (2006.01)
*B33Y 40/00* (2020.01)

(52) U.S. Cl.
CPC ............... *G01B 7/24* (2013.01); *B33Y 40/00* (2014.12)

(58) Field of Classification Search
CPC ......... G01B 7/24; B33Y 40/00; G01L 5/0047; G01N 2203/0635
See application file for complete search history.

(56) References Cited

U.S. PATENT DOCUMENTS

| 4,939,937 A * | 7/1990 | Klauber | G01L 3/105 73/862.333 |
| 2009/0143933 A1 * | 6/2009 | Kawaura | G01B 7/14 701/31.4 |

(Continued)

FOREIGN PATENT DOCUMENTS

| DE | 102011080282 A1 * | 2/2013 | ............... G01L 1/12 |
| EP | 2749615 A1 | 7/2014 | |

(Continued)

OTHER PUBLICATIONS

Grandal et al., "Technique for Embedding Fiber Optics in Metallic Structures for Smart Material Applications", 8th European Workshop On Structural Health Monitoring (EWSHM 2016), Bilbao, Spain, Jul. 5-8, 2016, pp. 1-7.

(Continued)

*Primary Examiner* — Christopher E Mahoney
(74) *Attorney, Agent, or Firm* — Seckel IP, PLLC

(57) ABSTRACT

The method is for the discriminant monitoring of a composite multi-material assembly (1) having at least one internal layer (10) made of a first, electrically conductive composite material and a second layer (11) made of a second, electrically insulating composite material, the second layer (11) covering the first internal layer (10). The method includes: —preparing the composite multi-material assembly (1) by exposing a portion (101) of the internal layer (10), which constitutes a first electrode; —applying a second electrode (103) to the surface of the second layer (11), one of these electrodes (103) being earthed; —performing discriminant monitoring wherein a current is generated between the first electrode (101) and the second electrode (103) by applying a threshold voltage Us predetermined by calibration to characterize a lack of structural defects, the appearance of a breakdown at a voltage lower than the threshold voltage Us being indicative of the presence of at least one structural defect in the composite assembly (1).

20 Claims, 4 Drawing Sheets

(56) References Cited

U.S. PATENT DOCUMENTS

| | | | |
|---|---|---|---|
| 2015/0008912 A1* | 1/2015 | Maier | G01N 27/82 |
| | | | 324/238 |
| 2018/0080582 A1 | 3/2018 | Carpignano | |
| 2020/0370975 A1 | 11/2020 | Shen et al. | |

FOREIGN PATENT DOCUMENTS

| | | | |
|---|---|---|---|
| EP | 3290766 A1 | 3/2018 | |
| WO | 2014058336 A1 | 4/2014 | |
| WO | WO-2019162654 A1 * | 8/2019 | ........... B29C 64/153 |

OTHER PUBLICATIONS

Grandal et al., "Analysis of Fiber Optic Sensor Embedded in Metals by Automatic and Manual TIG Welding", IEEE Sensors Journal, vol. 19, No. 17, Sep. 1, 2019, pp. 7425-7433.

Grandal et al., "Laser brazing metallic embedding technique for fiber optic sensors", 25th International Conference on Optical Fiber Sensors (OFS), Proceedings of SPIE, vol. 10323, 2017, pp. 103236S-1 to 103236S-4.

Grandal et al., "Smart metallic part manufacturing by laser-cladding based embedding of optical fiber sensors", Imaging and Applied Optics 2018 (3D, AO, AIO, COSI, DH, IS, LACSEA, LS&C, MATH, pcAOP), paper ATu3A.2, 2018, pp. 1-3.

Grandal et al., "Laser Cladding-Based Metallic Embedding Technique for Fiber Optic Sensors", Journal of Lightwave Technology, vol. 36, No. 4, Feb. 15, 2018, pp. 1018-1025.

Li et al., "Processing and microstructures of fiber Bragg grating sensors embedded in stainless steel", Metallurgical and Materials Transactions A, vol. 33A, 2002, pp. 3019-3024.

Li et al., "Metal Embedded Fiber Bragg Grating Sensors in Layered Manufacturing", Journal of Manufacturing Science and Engineering, vol. 125, Aug. 2003, pp. 577-585.

Havermann et al., "In-situ measurements with fibre Bragg gratings embedded in stainless steel", in 23rd International Conference on Optical Fibre Sensors (OFS2014), Proceedings of SPIE, vol. 9157, 2014, pp. 9157A1-1 to 9157A1-4 (total 5 pages).

Havermann et al., "Measuring residual stresses in metallic components manufactured with fibre Bragg gratings embedded by selective laser melting", 24th International Conference on Optical Fibre Sensors (OFS24), Proceedings of SPIE, vol. 9634, 2015, pp. 96340T-1 to 96340T-4 (total 5 pages).

Havermann et al., "Temperature and Strain Measurements With Fiber Bragg Gratings Embedded in Stainless Steel 316", Journal of Lightwave Technology, vol. 33, No. 12, Jun. 15, 2015, pp. 2474-2479.

Monaghan et al., "Solid-state additive manufacturing for metallized optical fiber integration", Composites Part A: Applied Science and Manufacturing, vol. 76, 2015, pp. 181-193.

Mou et al., "Smart structure sensors based on embedded fibre Bragg grating arrays in aluminium alloy matrix by ultrasonic consolidation", Measurement Science and Technology, vol. 20, Feb. 4, 2009, pp. 034013-1 to 034013-6 (total 7 pages).

Chilelli et al., "Detection of Crack Initiation and Growth Using Fiber Bragg Grating Sensors Embedded into Metal Structures through Ultrasonic Additive Manufacturing", Sensors, vol. 19, Nov. 12, 2019, pp. 4917-1 to 4917-18.

Li et al., "Ultrasonic embedding of nickel-coated fiber Bragg grating in aluminum and associated sensing characteristics", Optical Fiber Technology, vol. 18, 2012, pp. 7-13.

Dapino, "Additive manufacturing of smart metallic structures", SPIE Newsroom, Feb. 11, 2014, https://spie.org/news/5322-additive-manufacturing-of-smart-metallic-structures#_=_ (total 4 pages).

Alemohammad et al., "Metal Embedded Optical Fiber Sensors: Laser-Based Layered Manufacturing Procedures", Journal of Manufacturing Science and Engineering, vol. 133, Jun. 2011, pp. 031015-1 to 031015-12.

Alemohammad et al., "Smart tools with embedded optical fiber sensors: Laser based layered manufacturing procedures", International Congress on Applications of Lasers & Electro-Optics, Orlando, Florida, USA, 2009, pp. 1160-1164.

Alemohammad et al., "Fabrication of smart cutting tools with embedded optical fiber sensors using combined laser solid freeform fabrication and moulding techniques", Optics and Lasers in Engineering, vol. 45, Oct. 2007, pp. 1010-1017.

Saheb et al., "Fiber-Embedded Metallic Materials: From Sensing towards Nervous Behavior", Materials, vol. 8, Nov. 24, 2015, pp. 7938-7961.

Hossain et al., "Fabrication of smart parts using powder bed fusion additive manufacturing technology", Additive Manufacturing, vol. 10, Apr. 2016, pp. 58-66 (manuscript version; total 22 pages).

Choi et al., "Microfabrication and characterization of metal-embedded thin-film thermomechanical microsensors for applications in hostile manufacturing environments", Journal of Microelectromechanical Systems, vol. 15, No. 2, Apr. 2006, pp. 322-329.

Li et al., "Shape deposition manufacturing of smart metallic structures with embedded sensors", 7th Annual International Symposium on Smart Structures and Materials: Sensory Phenomena and Measurement Instrumentation for Smart Structures and Materials, Proceedings of SPIE, vol. 3986, Jun. 12, 2000, pp. 160-172 (total 13 pages).

Li et al., "Embedding and characterization of fiber-optic and thin-film sensors in metallic structures", Sensor Review, vol. 24, No. 4, 2004, pp. 370-377.

Pille, "In process embedding of piezo sensors and RFID transponders into cast parts for autonomous manufacturing logistics", Smart Systems Integration, Como, Italy, Mar. 23-24, 2010, Paper 20, VDE Verlag GmbH, Berlin, Germany (total 10 pages).

Petrat et al., "Embedding electronics into additive manufactured components using laser metal deposition and selective laser melting", Procedia CIRP, vol. 74, 2018, pp. 168-171.

VTT, "VTT has 3D printed a smart metal part: a step towards artificial intelligence", News, Press release, Apr. 16, 2018, https://www.vttresearch.com/media/news/vtt-has-3d-printed-a-smart-metal-part (total 3 pages).

Paganin et al., "Single-image geometric-flow x-ray speckle tracking", Phys. Rev. A, vol. 98, No. 053813, 2018; arXiv version (total 7 pages).

International Search Report and Written Opinion dated Oct. 4, 2022 in corresponding application No. PCT/FR2022/051333; with English partial translation and partial machine translation (total 17 pages).

(56) References Cited

OTHER PUBLICATIONS

Deng et al., "Review of magnetostrictive materials for structural vibration control", Smart Materials and Structures, IOP Publishing Ltd., Bristol, U.K., vol. 27, No. 11, Oct. 23, 2018, pp. 113001-1 to 113001-18.

\* cited by examiner

[Fig. 1]
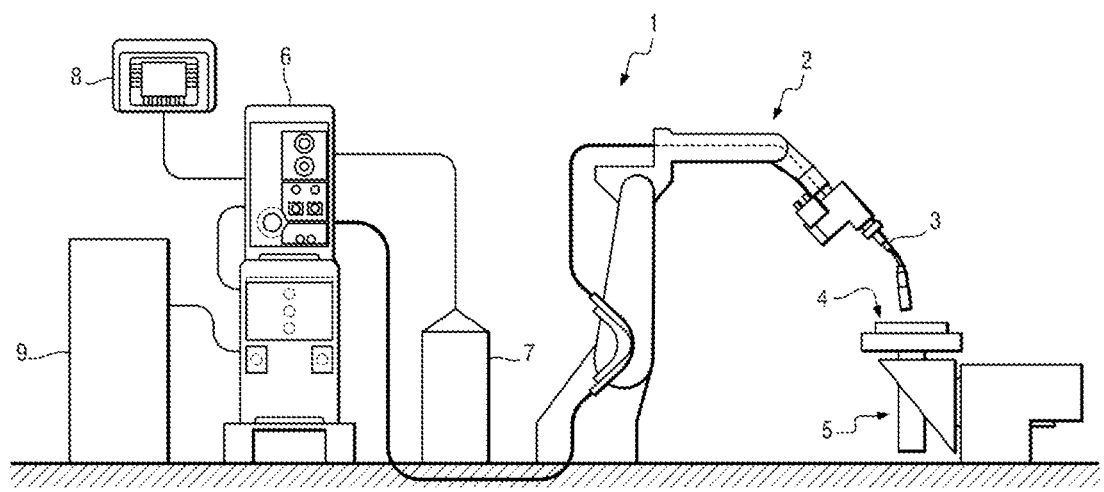
[Fig. 2]
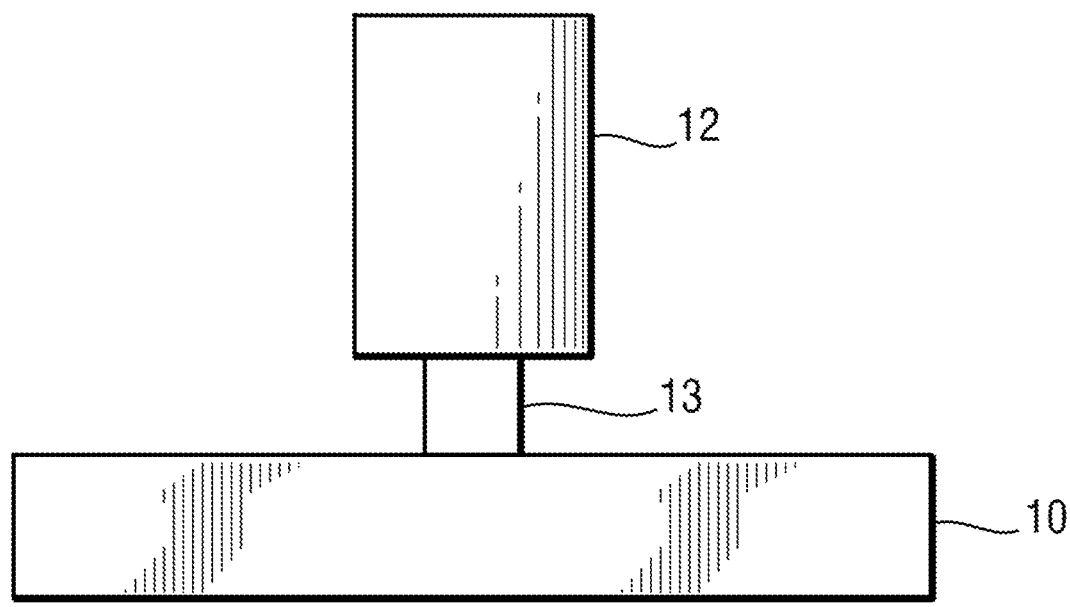

[Fig. 3]
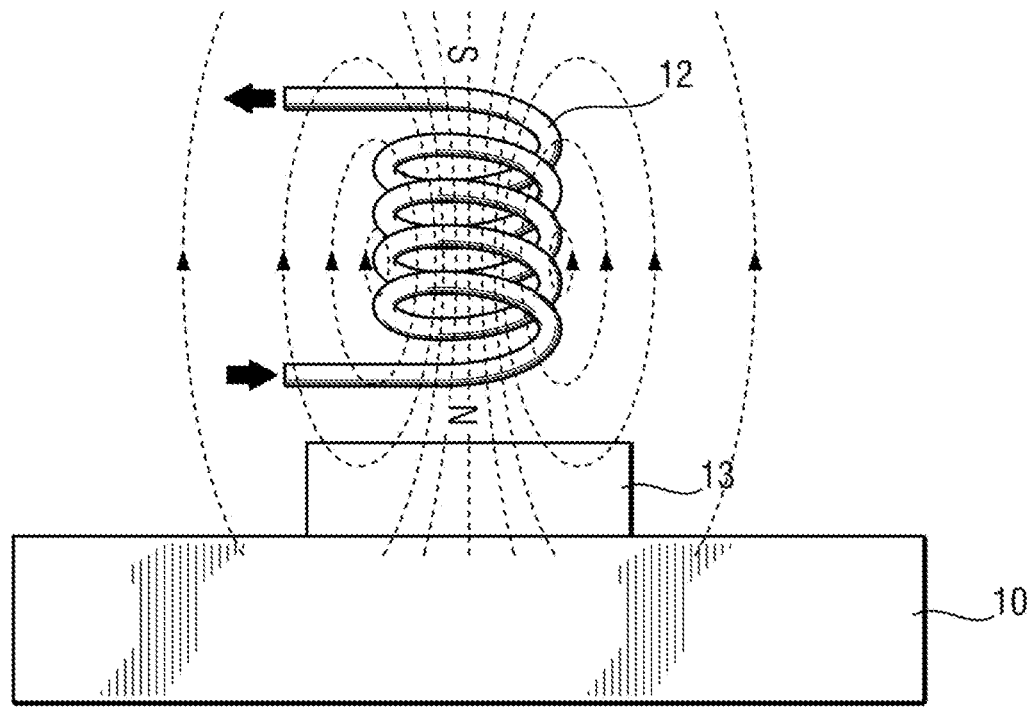
[Fig. 4]
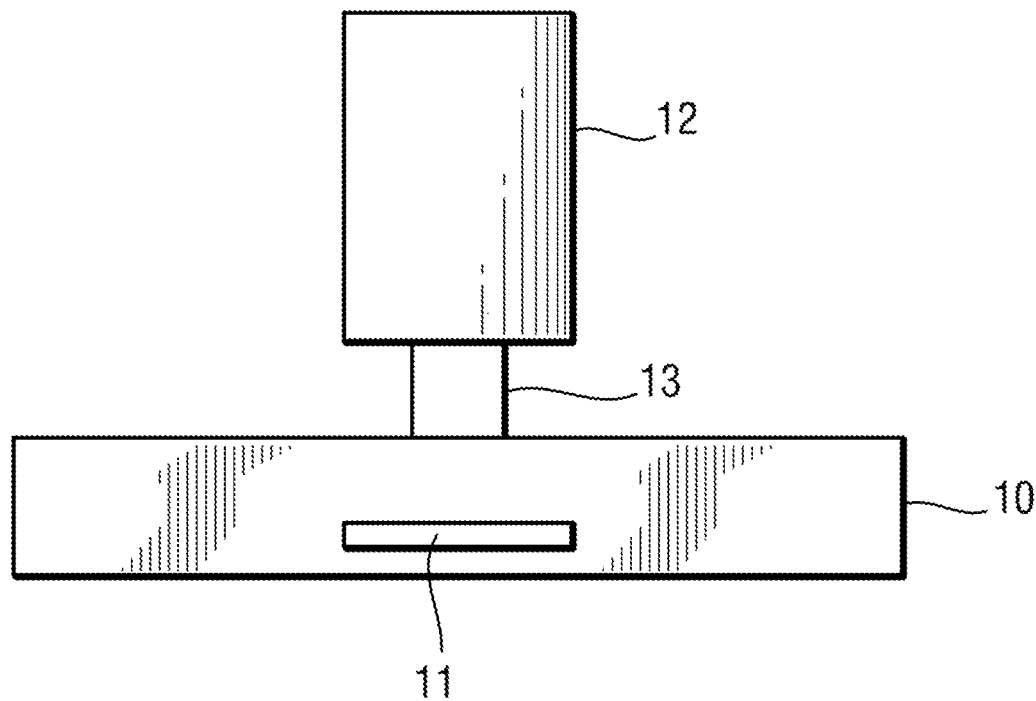

[Fig. 5]
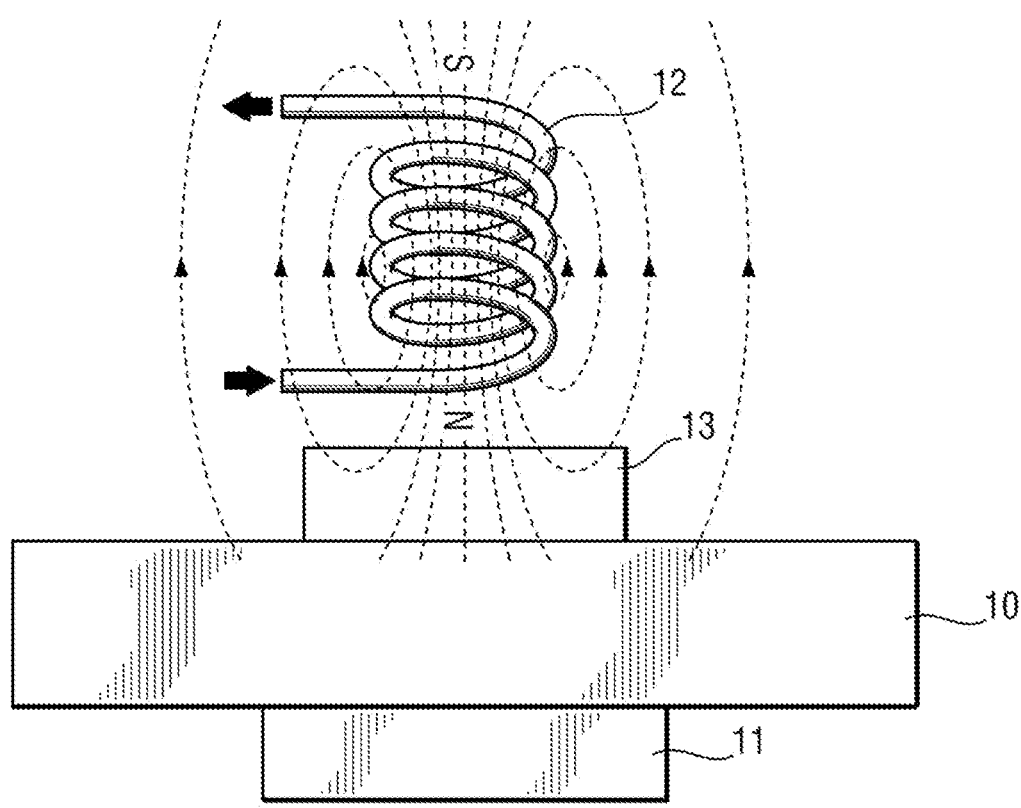

[Fig. 6]
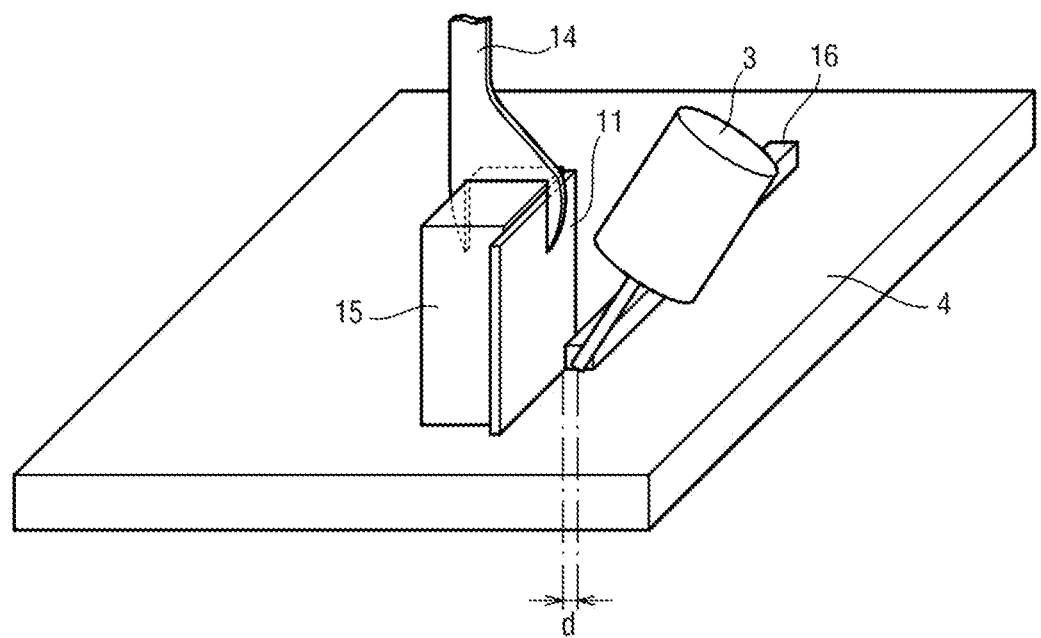
[Fig. 7]
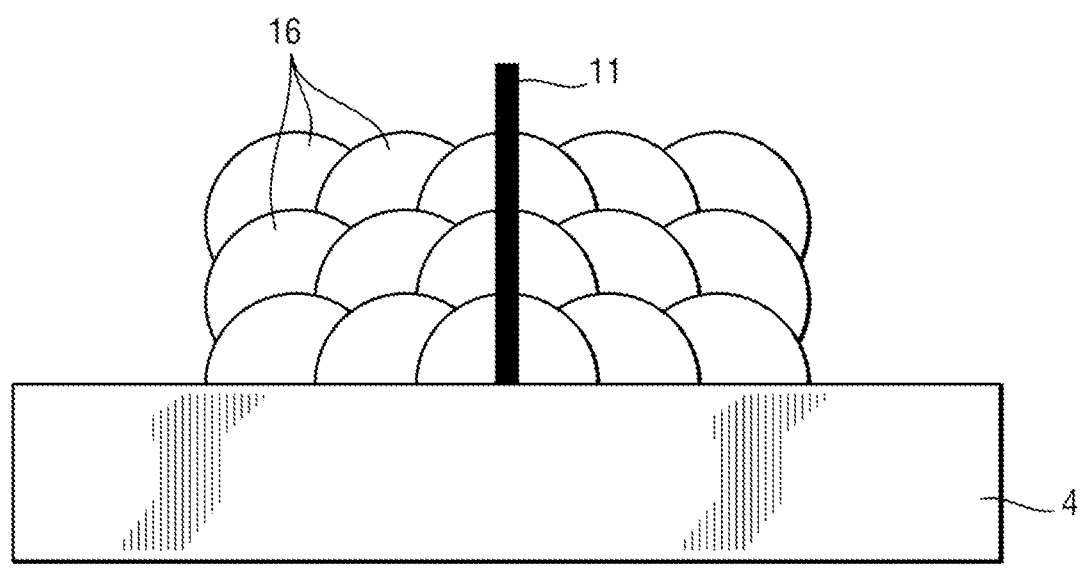

METHOD FOR DETERMINING A DEFORMATION OF AN AREA OF A PART OBTAINED BY ADDITIVE MANUFACTURING

The present invention has for object a method for determining a deformation of an area of a part obtained by additive manufacturing. The method applies in particular to aluminum parts made by wire arc additive manufacturing (WAAM).

The implementation of a test piece structure in a weld or in a part produced by metal additive manufacturing, enabling the stresses to which that part has been subjected to be determined, is known from the prior art.

Considerable research has been based on the insertion of Bragg grating fiber optic sensors used as deformation sensors. They are made using tungsten inert gas (TIG) welding [1-2] or laser welding [3-5] using tin as the filler metal. Similar studies have also been carried out for stainless steel additive manufacturing [6-10]. The optimum welding parameters and the defects around the embedded fibers have been analyzed in these studies.

These fiber optic sensors can also be inserted in parts produced by ultrasonic welding and, by extension, in additive manufactured parts produced by ultrasound welding [11-15]. Optical fibers have also been embedded in alloys of nickel or lead and tin by electrolytic deposition or casting [16-18] to produce smart cutting tools.

Numerous articles concerning the introduction of intelligence into metal parts by inserting optical fibers are cited in the paper by Saheb and Mekid [19]. However, these are optical sensors necessitating a metal layer, most often based on nickel, needed to produce adhesion with the host part.

Optical fibers are however not the only elements that have been inserted in metal parts during their process of manufacture. More comprehensive electronic systems such as piezoelectric sensors or thin film type strain gauges and their connectors have been incorporated into additive manufacturing processes using electron beam fusion [20], powder bed fusion [21-23] or for cast parts [24].

These systems can also be integrated in parts during manufacture without being welded to the part but being immobilized by welding. Thus Petrat [25] integrates an electronic system and protects the connectors by means of a system of curved grooves. The connectors are placed in the hollow of the groove, at a distance from the molten metal that closes the mouth, produced here by a direct metal deposition (DMD) process. The group VTT in Finland has also announced the possibility of introducing microchips during the manufacture of parts [26].

All these systems necessitate either a distance from the weld or a ceramic encapsulation and/or a metal encapsulation to be inserted cleanly into a metal part.

The present invention aims to remedy these disadvantages.

The invention therefore has for object a method for determination of a deformation of a predetermined zone of a part obtained by additive manufacturing, the deformation being generated by stress in the part.

The method according to the invention includes:
  before stress is applied to the part, a step of positioning a magnetostrictive test piece in a representative zone of the deformation, and
  a step of determination of said deformation with the aid of a sensor configured to measure the magnetic permeability of the magnetostrictive test piece, the deformation being determined as a function of the variation of the magnetic permeability of the magnetostrictive test piece between before and after stress is applied to the part.

Thus the invention resides in the inclusion in the part, in particular during the production of the part, of a magnetostrictive test piece that enables the stresses to which the latter has been subjected to be determined. Indeed, when stress is applied to magnetostrictive materials their magnetic permeability changes.

The step of determination of said deformation may include measurement of the magnetic permeability of the magnetostrictive test piece before the part is subjected to stress and measuring the magnetic permeability of the magnetostrictive test piece after it is subjected to stress.

The sensor may include at least one measurement probe adapted to be positioned on or in the vicinity of the magnetostrictive test piece, each measurement probe consisting of a casing in which are disposed means for generating a magnetic field and at least one magnetic field measurement sensor connected to a field measuring device.

The sensor may be a Hall-effect sensor.

The sensor may include a magnet associated with a coil.

The coil and the magnet may be associated with a capacitor that is connected in parallel with the coil.

The value of the inductance is proportional to the permeability of the ferrite of the coil. The test piece facing the magnet enables modification of the inductance by introducing a magnetic effect such as by means of a secondary magnet. By measuring through the material of the part the magnetic state of the magnetostrictive test piece or pieces it is possible to deduce the deformations and therefore the stresses to which it is or they are subjected and thus to work back to the state of stress of the manufactured part.

The deformation may be determined as a function of the variation of the inductance of the coil between before and after it is subjected to stress, the step of determination of said deformation being able to include a measurement of the inductance before the part is subjected to stress and a measurement of the inductance after the part is subjected to stress.

The deformation to which the printed part is subjected is transmitted in part to the test piece (test body). On deforming, the magnetic characteristics of this test piece are seen to vary. The sensor being able to measure its magnetic state, it makes it possible to work back to the deformation of the test piece and, through knowing the total mechanical behavior of the part, to work back to the deformations to which the part has been subjected.

The inductance is measured with the aid of a commercial dedicated apparatus which may be an impedance meter or by detection of a resonant frequency by a synchronous detection system.

The sensor may combine a coil with a ferrite core and a magnet. When this sensor is close to the magnetostrictive test piece, the latter modifies the magnetic field at the level of the coil/magnet interface. This therefore modifies the permeability of the ferrite core constituting the coil and consequently its inductance. Accordingly, upon deformation, the magnetic permeability of the test piece varies and its influence on the sensor therefore varies the value of the inductance.

The magnetic behaviors of certain steels when stressed are known and provide the value of the permeability relative to the imposed deformation.

Knowing the mechanical behavior of the test piece then makes it possible to work back to the stress from its known deformation.

The magnetostrictive test piece is advantageously placed in a representative zone of the deformation and in contact with said predetermined zone or in the vicinity of said predetermined zone. To avoid changing the mechanical behavior of the part, the test piece is preferably included at a location that does not weaken the part subjected to stress in use while enabling information to be obtained remotely on the stress state at the locations of interest (for example: those of building in, boring). The position of the test piece is determined during the mechanical design of the part in order to identify ideal locations enabling its inclusion without causing mechanical disturbances (weakening, modification of the local stiffness).

The representative zone of the deformation is a zone where the deformation is seen, for example an edge zone of the deformation or a remote zone representative of the state of deformation of the critical zone (the epicenter of the deformation).

The method may include before the step of positioning the magnetostrictive test piece a step of determination by simulation of the representative zone of the deformation.

The representative zone of the deformation may be an edge zone of the deformed predetermined zone.

The step before the part is subjected to stress of positioning a magnetostrictive test piece in a representative zone of the deformation can take place during the process of manufacturing the part and the method may further include a step of adjusting manufacturing parameters of the part for clean integration of the magnetostrictive test piece into the part.

The part may be obtained by metal wire arc additive manufacture.

The part may be made of a non-ferromagnetic material or more generally an amagnetic material.

The part may include an amagnetic metal, for example chosen from aluminum and titanium, or from other amagnetic materials.

The magnetostrictive test piece may include a steel, an iron-gallium alloy, an alloy of terbium, dysprosium and iron, or an alloy of iron, nickel and cobalt, or potentially all types of magnetostrictive materials.

In its initial production the sensor consists of a permanent magnet and coil with a ferromagnetic core of inductance L. The coil may be replaced by a magnetic field sensor and the magnet may be a permanent magnet or an electromagnet.

The sensor formed of the coil and of the magnet is advantageously associated with a capacitor of capacitance C in parallel with the coil and thus creating an LC resonator, the resonant frequency ($\omega_0 = 1/\sqrt{LC}$) of which can be adjusted.

The variations in the magnetic state of the target are reflected in modifications of the effective relative magnetic permeability ($\mu r$) of the ferromagnetic core of the coil.

In concrete terms:
  when the sensor is placed on an amagnetic conductive material (e.g. aluminum, titanium, copper), the inductance L is modified by the appearance of Eddy currents; the inductance L is therefore a function of the thickness of the metal and of the conductivity of the metal;
  if a magnetic test piece is positioned under an amagnetic conductive material the inductance L is then a function of the thickness of the metal, of the conductivity of the metal, of the depth of the test piece, of the permeability of the test piece, and of the volume of the test piece.

Any stress inducing deformation of the magnetic test piece will therefore lead to modification of the magnetic permeability of the test piece and therefore variation of an electric magnitude of the resonator (frequency shift, impedance modification).

Other advantages and particular features of the present invention will emerge from the following description given by way of non-limiting example and with reference to the appended figures.

FIG. 1 depicts schematically a device for metal additive manufacture of a part,

FIG. 2 is a first diagrammatic view of a device for executing the method according to the invention in a first configuration of the device, FIG. 3 is a second diagrammatic view of the device for executing the method according to the invention in the first configuration of the device, FIG. 4 is a first schematic view of a device for executing the method according to the invention in a second configuration of the device, FIG. 5 is a second schematic view of the device for executing the method according to the invention in the second configuration of the device, FIG. 6 is a perspective view depicting the positioning of a magnetostrictive test piece in the part, FIG. 7 is a side view depicting the position of a magnetostrictive test piece in the part.

DETAILED DESCRIPTION

The invention lies in the field of preventive maintenance of mechanical parts. New additive manufacturing technologies, in particular of wire arc additive manufacturing (WAAM) type, enable production of complex three-dimensional parts in amagnetic metals that can be welded that do not become magnetic after welding, such as aluminum or tin, and without using casting.

Additive manufacturing has revolutionized the manufacturing paradigm over recent years by offering the possibility of creating parts of very complex shape, or even shapes impossible to obtain by conventional methods, without tools and in very short times. The various additive manufacturing techniques include wire arc additive manufacturing (WAAM) in the direct energy deposition (DED) family. According to the ASTM F standard 279-12A (Standard Terminology for Additive Manufacturing Technologies), these methods are defined as the combination of an electrical arc used as a source of heat and a wire used as a filler raw material.

As depicted in FIG. 1, a WAAM type additive manufacturing device 1 includes a robot 2 that is fitted with a torch 3 enabling additive manufacturing on a substrate 4. The substrate 4 is disposed on a two-axis gear device 5.

The robot 2 is connected to a generator 6 that is itself connected to a tank 7 of gas, to a remote control unit 8 and to a control system for the robot 9.

FIGS. 2 to 4 show a part 10 obtained by the method described hereinabove. The invention consists in particular in including during the phase of production of the part 10 a magnetostrictive test piece 11, for example a steel test piece part, that enables the deformations of the part 10 and therefore of the stresses exerted on it to be determined (FIGS. 4 and 5).

The method according to the invention is advantageously in two parts.

A first part includes the inclusion of a test piece 11, for example a test piece less than 1 mm thick with an area less than 1 cm², in the aluminum part 10 at a distance of 0.5 to 5 mm from the surface of the part 11, in a zone enabling monitoring of the stresses to which this part 11 is subjected.

The test piece 11 is therefore invisible to external inspection. To this end a first step consists in determining, based on the specifications and a design concept of the product, the position of the steel test piece 11 to monitor the stresses to which the part 10 is subjected during the phase of use defined by the specifications. The geometry of the part 10 may be adapted accordingly. The objective of the second step is to simulate the behavior of the part 10, ensuring that the test piece 11 responds, as a function of the various loads, to expectations (possibly with a return to the preceding step if the results of the simulation do not conform). These two steps are based on finite element modelling and simulation. At the end of these two steps the phase of designing the smart part is finished. The next step relates to the preparation for manufacturing. The manufacturing strategy (generation of trajectories and choice of parameters of the method) is defined so as to be compatible with the manufacture of the part 10 and the insertion of the steel test piece 11. Finally, the final steps concern validation of the strategy for manufacturing the smart part and the test of its behavior.

The second part concerns the use of a sensor for determining the deformation.

Initially this sensor consists of a coil 12 having for example an inductance of a few mH. The novelty resides in the attachment of a magnet 13 (with an area for example less than 1 cm$^2$ and a thickness for example of the order of a few millimeters) onto the coil 12. This reduces its inductance value ($L_0 \rightarrow L_1$) by disturbance of the ferrite constituting the core of the coil. A capacitor, not represented, is advantageously connected in parallel with the coil 12/magnet 13 assembly in order to offset the resonant frequency of the resulting LC filter.

The resonant frequency of the sensor ($f_0$ and $\phi=0°$) is first measured at a location far from any metal target. Thereafter the sensor is placed on an aluminum part 10. Eddy currents then disturb the inductance of the sensor, which leads to a reduction of its value ($L_1 \rightarrow L_2$). The resonant frequency is changed by this and the working frequency is chosen corresponding to a phase $\phi=-45°$. This choice corresponds to an operating point at which the sensitivity in °/Hz is the highest. Finally, when a steel test piece 11 is placed under the aluminum a variation of the inductance ($L_2 \rightarrow L_3$) is seen, caused this time by the magnetic influence. Indeed the presence of steel close to a magnet increases by a few hundred μT or even one mT the magnetic field seen by the inductance. This disturbance leads to reduction of the inductance of the sensor, the resonant frequency which therefore increases.

The difference between the initial phase of −45° in the case of aluminum alone and the phase obtained from the steel test piece enables measurement of the magnetic state of the test piece through knowing its volume.

The next step then consists in subjecting the assembly to stress and noting the variations of the phase of the impedance of the sensor that are generated by the variation of the permeability of the steel under stress. It is thus possible to work back to the stresses to which the test piece is subjected and therefore to the stresses to which the aluminum part is subjected.

To verify that the sensor is sensitive to the variations of permeability, two experiments have been carried out:

varying the thickness of the steel test piece under the aluminum from 10 μm to 1 mm, each test piece having its own signature, placing an aluminum sample (a few mm thick) under which a steel test piece has been glued in a furnace with our sensor, whereupon the signals obtained showed stresses generated in the steel by the thermal expansion phenomenon.

FIG. 6 represents an example of an installation for covering and embedding a magnetic inclusion 11 (the test piece). The latter inclusion is retained by a clamp 14 on a mass 15 serving as a heat exchanger. The test piece 11 can be retained in a given position by other means and without a heat exchanger. Here weld beads 16 are produced with a welding torch 3 but they may be produced using a different technology. Depending on the parameters used to produce the bead 16, the distance d between the surface of the inclusion 11 and the center of the closest weld bead can vary.

FIG. 7 represents a side view in section of the magnetic inclusion 11. It is embedded a plurality of weld beads 16 stacked on one another and deposited on respective opposite sides of the magnetic inclusion 11.

LIST OF REFERENCES

[1] Grandal et al., «Technique for Embedding Fiber Optics in Metallic Structures for Smart Material Applications», 8th European Workshop On Structural Health Monitoring (EWSHM 2016), 5-8 Jul. 2016.

[2] T. Grandal et al, «Analysis of Fiber Optic Sensor Embedded in Metals by Automatic and Manual TIG Welding», IEEE Sensors J., vol. 19, no 17, p. 7425 7433, September 2019, doi: 10.1109/JSEN.2019.2916639.

[3] T. Grandal et al, «Laser brazing metallic embedding technique for fiber optic sensors», in 2017 25th Optical Fiber Sensors Conference (OFS), April 2017, p. 1 4, doi: 10.1117/12.2263974.

[4] T. Grandal et al «Smart metallic part manufacturing by laser-cladding based embedding of optical fiber sensors», in Imaging and Applied Optics 2018 (3D, AO, AIO, COSI, DH, IS, LACSEA, LS&C, MATH, pcAOP) (2018), paper ATu3A.2, June 2018, p. ATu3A.2, doi: 10.1364/AIO.2018.ATu3A.2.

[5] T. Grandal et al «Laser Cladding-Based Metallic Embedding Technique for Fiber Optic Sensors», Journal of Lightwave Technology, vol. 36, no 4, p.1018 1025, February 2018, doi: 10.1109/JLT.2017.2748962.

[6] X. Li et al «Processing and microstructures of fiber Bragg grating sensors embedded in stainless steel», Metallurgical and Materials Transactions A, vol. 9, no33, p. 3019-3024, 2002.

[7] X. Li et al «Metal Embedded Fiber Bragg Grating Sensors in Layered Manufacturing», Journal of Manufacturing Science and Engineering, vol. 125, no 3, p. 577 585, August 2003, doi: 10.1115/1.1581889.

[8] D. Havermann et al «In-situ measurements with fibre Bragg gratings embedded in stainless steel», in 23rd International Conference on Optical Fibre Sensors, June 2014, vol. 9157, p. 9157A1, doi: 10.1117/12.2059587.

[9] D. Havermann et al «Measuring residual stresses in metallic components manufactured with fibre Bragg gratings embedded by selective laser melting», in 24th International Conference on Optical Fibre Sensors, September 2015, vol. 9634, p. 96340T, doi: 10.1117/12.2194352.

[10] D. Havermann et al «Temperature and Strain Measurements With Fiber Bragg Gratings Embedded in Stainless Steel 316», Journal of Lightwave Technology, vol. 33, no 12, p. 2474 2479, June 2015, doi: 10.1109/JLT.2014.2366835.

[11] T. Monaghan et al «Solid-state additive manufacturing for metallized optical fiber integration», Composites Part A: Applied Science and Manufacturing, vol. 76, p. 181 193, September 2015, doi: 10.1016/j.compositesa.2015.05.032.

[12] C. Mou et al «Smart structure sensors based on embedded fibre Bragg grating arrays in aluminium alloy matrix by ultrasonic consolidation», Meas. Sci. Technol., vol. 20, no 3, p. 034013, 2009, doi: 10.1088/0957-0233/20/3/034013.

[13] S. K. Chilelli et al «Detection of Crack Initiation and Growth Using Fiber Bragg Grating Sensors Embedded into Metal Structures through Ultrasonic Additive Manufacturing», Sensors, vol. 19, no 22, p. 4917, January 2019, doi: 10.3390/s19224917.

[14] Y. Li et al «Ultrasonic embedding of nickel-coated fiber Bragg grating in aluminum and associated sensing characteristics», Optical Fiber Technology, vol. 18, no 1, p. 7 13, January 2012, doi: 10.1016/j.yofte.2011.09.004.

[15] M. Dapino «Additive manufacturing of smart metallic structures», SPIE Newsroom, February 2014, doi: 10.1117/2.1201401.005322.

[16] H. Alemohammad et al «Metal Embedded Optical Fiber Sensors: Laser-Based Layered Manufacturing Procedures», J. Manuf. Sci. Eng, vol. 133, no 3, p. 031015-031015 12, June 2011, doi: 10.1115/1.4004203. [17] D. M. Paganin, H. Labriet, E. Brun, S. Berujon, Single-image geometric-flow x-ray speckle tracking, Physics.med. (2018).

[17] H. Alemohammad et al «Smart tools with embedded optical fiber sensors: Laser based layered manufacturing procedures», in International Congress on Applications of Lasers & Electro-Optics, Orlando, Florida, USA, 2009, p. 1160 1164, doi: 10.2351/1.5061467.

[18] H. Alemohammad et al «Fabrication of smart cutting tools with embedded optical fiber sensors using combined laser solid freeform fabrication and moulding techniques», Optics and Lasers in Engineering, vol. 45, no 10, p. 1010 1017, October 2007, doi: 10.1016/j.optlaseng.2007.04.006.

[19] N. Saheb et al «Fiber-Embedded Metallic Materials: From Sensing towards Nervous Behavior», Materials, vol. 8, no 11, p. 7938 7961, November 2015, doi:10.3390/ma8115435.

[20] M. S. Hossain et al. «Fabrication of smart parts using powder bed fusion additive manufacturing technology», Additive Manufacturing, vol. 10, p. 58 66, April 2016, doi: 10.1016/j.addma.2016.01.001.

[21] H. Choi et al «Microfabrication and characterization of metal-embedded thin-film thermomechanical microsensors for applications in hostile manufacturing environments», Journal of Microelectromechanical Systems, vol. 15, no 2, p. 322 329, April 2006, doi: 10.1109/JMEMS.2006.872235.

[22] X. Li et al «Shape deposition manufacturing of smart metallic structures with embedded sensors», in Smart Structures and Materials 2000: Sensory Phenomena and Measurement Instrumentation for Smart Structures and Materials, June 2000, vol. 3986, p. 160 172, doi: 10.1117/12.388103.

[23] X. Li et al «Embedding and characterization of fiber-optic and thin-film sensors in metallic structures», Sensor Review, vol. 24, no 4, p. 370 377, December 2004, doi: 10.1108/02602280410558403.

[24] C. Pille, «In process embedding of piezo sensors and RFID transponders into cast parts for autonomous manufacturing logistics», Smart Systems Integration, Como, Italy, March 2010.

[25] T. Petrat et al «Embedding electronics into additive manufactured components using laser metal deposition and selective laser melting», Procedia CIRP, vol. 74, p. 168 171, January 2018, doi: 10.1016/j.procir.2018.08.071.

[26] https://www.vttresearch.com/media/news/vtt-has-3d-printed-a-smart-metal-part

The invention claimed is:

1. A method for determination of a deformation of a predetermined zone of a part obtained by additive manufacturing, the deformation being generated by stress in the part, wherein the method includes:
   before stress is applied to the part, positioning a magnetostrictive test piece in a zone representative of the deformation, and
   determining the deformation using a sensor configured to measure the magnetic permeability of the magnetostrictive test piece, the deformation being determined as a function of a variation of a magnetic permeability of the magnetostrictive test piece between before and after stress is applied to the part, the sensor including a magnet associated with a coil including a ferrite core, the coil and the magnet being associated with a capacitor connected in parallel with the coil.

2. The method as claimed in claim 1, wherein the deformation is determined as a function of a variation of an inductance of the coil between before and after stress is applied, the determining of the deformation including measuring the inductance of the coil before stress is applied to the part and measuring the inductance of the coil after stress is applied to the part.

3. The method as claimed in claim 2, wherein the magnetostrictive test piece is placed in the zone representative of the deformation and in contact with the predetermined zone or in proximity of the predetermined zone.

4. The method as claimed in claim 3, further including, before the positioning the magnetostrictive test piece, determining by simulation of the zone representative of the deformation.

5. The method as claimed in claim 2, further including, before the positioning the magnetostrictive test piece, determining by simulation of the zone representative of the deformation.

6. The method as claimed in claim 2, wherein the zone representative of the deformation is an edge zone of the deformed predetermined zone.

7. The method as claimed in claim 2, wherein
   before stress is applied to the part, the positioning a magnetostrictive test piece in the zone representative of the deformation takes place during a process of manufacture of the part, and
   the method further includes adjusting manufacturing parameters of the part for clean integration of the magnetostrictive test piece into the part.

8. The method as claimed in claim 1, wherein the magnetostrictive test piece is placed in the zone representative of the deformation and in contact with a predetermined zone or in proximity of the predetermined zone.

9. The method as claimed in claim 8, further including, before the positioning the magnetostrictive test piece, determining by simulation of the zone representative of the deformation.

10. The method as claimed in claim 8, wherein the zone representative of the deformation is an edge zone of the deformed predetermined zone.

11. The method as claimed in claim 8, wherein
before stress is applied to the part, the positioning a magnetostrictive test piece in the zone representative of the deformation takes place during a process of manufacture of the part, and
the method further includes adjusting manufacturing parameters of the part for clean integration of the magnetostrictive test piece into the part.

12. The method as claimed in claim 1, further including, before the positioning the magnetostrictive test piece, determining by simulation of the zone representative of the deformation.

13. The method as claimed in claim 12, wherein the zone representative of the deformation is an edge zone of the deformed predetermined zone.

14. The method as claimed in claim 12, wherein
before stress is applied to the part, the positioning a magnetostrictive test piece in the zone representative of the deformation takes place during a process of manufacture of the part, and
the method further includes adjusting manufacturing parameters of the part for clean integration of the magnetostrictive test piece into the part.

15. The method as claimed in claim 1, wherein the zone representative of the deformation is an edge zone of the deformed predetermined zone.

16. The method as claimed in claim 1, wherein
before stress is applied to the part, the positioning a magnetostrictive test piece in the zone representative of the deformation takes place during a process of manufacture of the part, and
the method further includes adjusting manufacturing parameters of the part for clean integration of the magnetostrictive test piece into the part.

17. The method as claimed in claim 1, wherein the part is obtained by metal wire arc additive manufacturing.

18. The method as claimed in claim 1, wherein the part is an amagnetic material part.

19. The method as claimed in claim 18, wherein the part includes an amagnetic metal chosen from the group consisting of aluminum and titanium.

20. The method as claimed in claim 1, wherein the magnetostrictive test piece contains a material selected from the group consisting of steel, an iron-gallium alloy, an alloy of terbium, dysprosium and iron, and an alloy of iron, nickel and cobalt.

* * * * *